United States Patent Office 2,750,431
Patented June 12, 1956

2,750,431

1,1,3-TRIFLUOROBUTADIENE, ITS POLYMER, AND PROCESSES OF MAKING THEM AND OTHER 1,1-DIFLUORINATED DIENES AND THEIR POLYMERS

Paul Tarrant and Alan M. Lovelace, Alachua County, Fla., assignors to the United States of America as represented by the Secretary of the Army No Drawing. Application May 18, 1953,
Serial No. 355,848

14 Claims. (Cl. 260—653)

This invention relates to 1,1-difluoro-substituted hydrocarbons, their preparation and polymers made therefrom, and more specifically relates to 1,1-difluoro-substituted dienes prepared by the dehydrobromination of intermediate compounds resulting from the synthesis of certain olefins with dibromodifluoromethane.

1,1-difluorinated dienes in accordance with the present invention are represented by the general formula $$F_2C:(C_2Y^1Y^2):CH_2$$

wherein $Y^1$ and $Y^2$ represent hydrogen, methyl, trihalomethyl or fluorine the first terminal group is difluoromethylene, and the opposite terminal group is unsubstituted methylene. The intermediate compounds, which are convertible into the foregoing dienes by dehydrobromination, have the general formula $$F_2BrC.(C_2Y^1Y^2HBr).CH_3$$

wherein $Y^1$ and $Y^2$ represent hydrogen, methyl, trihalomethyl or fluorine the first terminal group is bromodifluoro-methyl, and the opposite terminal group is unsubstituted methyl. These 1,3-dibrominated 1,1-difluorinated intermediate compounds in turn are adducts prepared by the reaction of dibromo-difluoromethane and an olefinic compound having the general formula $H(C_2Y^1Y^2)CH_3$, wherein $Y^1$ and $Y^2$ are members of the group consisting of hydrogen, methyl, trihalomethyl and fluorine. In a preferred form of our invention, $Y^1$ of the foregoing general formulae represents a member of the group consisting of fluorine and trihalomethyl, and $Y^2$ represents a member of the group consisting of hydrogen and methyl; thus, 1,1,3-trifluorobutadiene is prepared in accordance with the present invention by the dehydrobromination of the intermediate compound 1,1,3-trifluoro-1,3-dibromobutane, which in turn is an adduct prepared by the synthesis of dibromodifluoromethane and 2-fluoropropylene.

The series of reactions can be represented as follows:

(1)
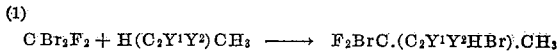

(2)
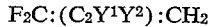

e. g.

(1) $CBr_2F_2 + CH_2:CHCH_3 \longrightarrow CF_2Br.CH_2.CHBr.CH_3$ (2)
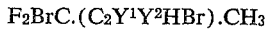

or (in a preferred form of our invention)

(1) $CBr_2F_2 + CH_2:CFCH_3 \longrightarrow CF_2Br.CH_2.CFBr.CH_3$ (2) $CF_2Br.CH_2.CFBr.CH_3 \xrightarrow{-2HBr} F_2C:CH.CF:CH_2$ Numerous other 1,1-difluoro-substituted dienes may be synthesized in accordance with the foregoing type reactions, by selecting a suitable olefin as the starting compound for the production of the intermediate adduct, as will be shown in somewhat greater detail in the ensuing portions of our specification. These 1,1-difluorinated dienes form useful polymers and copolymers, as will be explained in somewhat greater detail.

It is thus an object of our invention to produce 1,1-difluoro-substituted dienes (wherein the double bonds are adjacent the end carbons, e. g. 1,1-difluoro-butadiene-1,3).

Another object of our invention is to provide polymers and copolymers of the foregoing dienes.

A further object of our invention is the production of adducts by a reaction of dibromodifluoromethane with suitable olefins, said adducts being halogenated aliphatic hydrocarbon characterized by the presence of two fluorine and one bromine atom on one end carbon and an additional bromine atom linked to another carbon (not an end carbon).

A still further object of our invention is a high yield process of converting these adducts into 1,1-difluoro-substituted dienes.

A still further object of our invention is a process for the production of 1,1-difluorinated dienes, which employs readily available olefins as starting materials, and which can be practiced by the chemical manufacturer without need for delicate controls, and without the necessity of employing highly skilled technical personnel in its execution.

Further objects and advantages of our invention will be readily apparent from the following description of our invention and from the illustrative examples of practicing the same, set forth in connection therewith.

We have found that type Reaction 1 may be carried out by forming an adduct of dibromodifluoromethane and an unsubstituted or partially fluorinated olefin, such as propylene, butylene-2, isobutylene, 2-fluoropropylene, 2-fluorobutene-2, or 2-trifluoromethyl-propylene. The following table summarized a number of reactions in accordance with our invention:

TABLE I

| (1) Olefin Reacted with $CBr_2F_2$ | (2) Adduct from Col. 1 | (3) Diene Obtained by Dehydrobromination of Adduct of Col. 2 |
|---|---|---|
| propylene $CH_2:CHCH_3$ | $CF_2BrCH_2CHBrCH_3$ | $CF_2:CHCH:CH_2$ |
| butylene-2 $CH_3CH:CHCH_3$ | $CF_2BrCH(CH_3)CHBrCH_3$ | $CF_2:C(CH_3)CH:CH_2$ |
| isobutylene $CH_2:C(CH_3)_2$ | $CF_2BrCH_2CBr(CH_3)_2$ | $CF_2:CHC(CH_3):CH_2$ |
| 2-fluoropropylene $CH_2:CFCH_3$ | $CF_2BrCH_2CFBrCH_3$ | $CF_2:CHCF:CH_2$ |
| 2-fluoro-butylene-2 $CH_3CF:CHCH_3$ | $CF_2BrCH(CH_3)CFBrCH_3$ | $CF_2:C(CH_3)CF:CH_2$ |
| 2-trifluoromethylpropylene $CH_2:C(CF_3)CH_3$ | $CF_2BrCH_2CBr(CF_3)CH_3$ | Not yet determined, presumably $CF_2:CHC(CF_3):CH_2$ |

The formation of the adduct is carried out at elevated temperatures, preferably in the presence of an organic peroxide catalyst, such as benzoyl peroxide, acetyl peroxide, di-t-butyl peroxide. The dehydrobromination reaction of the adduct, to form the desired 1,1-difluorinated dienes, may be carried out in the manner of dehydrobrominating well known to the art, such as a reaction with alcoholic KOH. We have found, however, that much better yields are obtained by the use of tertiary amines, particularly tributylamine, and others preferably having a higher boiling point than triethylamine, as will be explained more fully.

The 1,1-difluorinated dienes obtained in accordance with our invention polymerize spontaneously to form elastomeric rubbery polymers; the polymerization can be accelerated by the use of well known polymerization catalysts, if desired. They also copolymerize with other unsaturated polymerizable monomers such as butadiene, isoprene, styrene, acrylonitrile, acrylic esters, vinyl esters (e. g. vinyl acetate) and vinyl ethers, vinylidene halides (e. g. vinylidene chloride), and fluorinated unsaturated hydrocarbons (e. g. chlorotrifluoroethylene, 1,1-difluoroethylene, or hexafluoro-butadiene-1,3). Other interesting copolymers may be formed by mixing two or more of our 1,1-difluorinated dienes, and permitting the mixture to polymerize.

We shall now proceed to illustrate our invention by means of a number of specific examples; it will be understood, of course, that these examples are illustrative and are not intended to limit the scope of our invention.

Example I

ADDUCT OF DIBROMODIFLUOROMETHANE AND PROPYLENE-1,1-DIFLUORO-1,3-DIBROMO-BUTANE

The following materials were sealed in a one liter autoclave: 710 parts of difluorodibromomethane, 34 parts of propylene and 8 parts of benzoyl peroxide. The autoclave was rocked and heated slowly to a temperature of 85° C. The temperature was then maintained at 85° C. with continued rocking for four hours. The oily material, remaining after removal of the unreacted difluorodibromomethane, was dried and fractionated at reduced pressure. 135 parts (66% yield) of $CF_2BrCH_2CHBrCH_3$ with the following constants was obtained: B. P. 64° C./61.8 mm., $n_D^{26}$ 1.4469, $d_4^{25}$ 1.8585, $MR_D$ 36.20 (calc'd), 36.22 (found), bromine per cent 63.44 (calc'd), 62.05 (found).

Example II

ADDUCT OF DIBROMODIFLUOROMETHANE AND 2-FLUOROPROPYLENE - 1,1,3 - TRIFLUORO-1,3-DIBROMO-BUTANE 315 parts of dibromodifluoromethane, 22 parts of 2-fluoropropylene and 5 parts of benzoyl peroxide were sealed in a one liter autoclave. The autoclave was rocked and heated slowly to 80° and maintained at that temperature for about three hours. The excess dibromodifluoromethane was removed, and the remaining oily material was dried and fractionated. 48 parts (58% yield) of $CF_2BrCH_2CFBrCH_3$ was obtained with the following constants: B. P. 52° at 35 mm., $n_D^{24}$ 1.4350, $d_4^{25}$ 1.9352, $MR_D$ 36.20 (calc'd), 36.19 (found).

Example III

ADDUCT OF DIBROMODIFLUOROMETHANE AND ISOBUTYLENE - 1,1 - DIFLUORO - 1,3-DIBROMO-3-METHYL-BUTANE

In a one liter autoclave were placed 512 parts of difluorodibromomethane. 28 parts of isobutylene and 5 parts of benzoyl peroxide. The autoclave was then rocked and heated slowly to 80° C. over a one hour period. This temperature was then maintained for four hours. The excess difluorodibromomethane was bled off and the dark oily residue dried over calcium chloride and fractionated. A yield of 85 parts of $CF_2BrCH_2CBr(CH_3)_2$ with the following constants was obtained: B. P. 83–84.2° C./81 mm. $n_D^{26}$ 1.4632, $d_4^{25}$ 1.730, $MR_D$ 40.82 (calc'd), 41.48 (found), bromine per cent 60.1 (calc'd), 58.6 (found).

Example IV

ADDUCT OF DIBROMODIFLUOROMETHANE AND 2-FLUOROBUTYLENE-2-1,1,3 - TRIFLUORO-1,3-DIBROMO-2-METHYL-BUTANE

The following materials were sealed in a one liter autoclave: 393 parts difluorodibromomethane, 33 parts 2-fluorobutylene-2, 5 parts benzoyl peroxide. The autoclave was rocked and heated slowly to 100° C. The temperature was maintained at 100° C. with rocking for three hours. The light amber colored oil obtained was dried and fractionated at reduced pressure. A yield of 96 parts of $CF_2BrCH(CH_3)CFBrCH_3$, was obtained with the following constants: B. P. 74.5° C./44 mm., $n_D^{26}$ 1.4469, $d_4^{25}$ 1.8414, $MR_D$ 40.72 (calc'd), 40.88 (found), bromine per cent 56.3 (calc'd), 56.8 (found).

Example V

ADDUCT OF DIBROMODIFLUOROMETHANE AND BUTYLENE - 2 - 1,1 - DIFLUORO-1,3-DIBROMO-2-METHYL-BUTANE

The process of Example IV was repeated, using an equivalent amount of butylene-2 in lieu of 2- fluorobutylene. A 70% yield of $CF_2BrCH(CH_3)CHBrCH_3$ with the following constants was obtained: B. P. 72° C./39 mm., $n_D^{25}$ 1.4621, $d_4^{25}$ 1.773, $MR_D$ 40.82 (calc'd), 41.22 (found), bromine per cent 60.1 (calc'd), 59.8 (found).

Example VI

ADDUCT OF DIBROMODIFLUOROMETHANE AND 2-TRIFLUOROMETHYL - PROPYLENE-1,1 - DIFLUORO-1,3-DIBROMO-3-FLUOROMETHYL-BUTANE 630 grams of dibromodifluoromethane, 54 grams of 2-trifluoromethyl1propylene, and 5 grams of tert-butyl peroxide were sealed in a one liter autoclave. The autoclave was rocked and heated slowly to 140° C. and maintained at that temperature with continued rocking for four hours. After removal of excess dibromodifluoromethane, 28 grams of oil were recovered. Upon fractionation, a portion was obtained having a B. P. of 59–62° C./42 mm., $n_D^{26.5}$ 1.4715, $d_4^{25}$ 1.8102. This material is

$CF_2BrCH_2Br(CF_3)CH_3$ containing a small amount of impurities.

In lieu of 2-trifluoromethyl-propylene, other 2-trihalomethylpropylenes may be used as starting materials; thus, the synthesis of 2-trichloromethylpropylene and dibromodifluoromethane will yield the adduct

$CF_2Br.CH_2CBr(CCl_3).CH_3$

The 1 to 1 adducts obtained in accordance with the foregoing examples are converted to 1,1-difluoro-substituted dienes by a dehydrobromination reaction, i. e. by the removal of 2 mols of HBr. As heretofore stated, this may be done by reacting the adducts with a solution of potassium hydroxide in ethyl alcohol (e. g. a solution of 100 gram technical grade KOH in 150 ml. 95% ethanol) in a refluxing condenser, the KOH solution being added dropwise; or by the use of fused KOH onto which the adduct is dropped in a refluxing condenser. Yields thus obtained are low.

We have found, however, that chemically pure 1,1-difluoro-substituted dienes may be obtained from these adducts by dehydrobromination with tertiary amines. We postulate that the addition of 2 mols of tertiary amine to the adduct results in the formation of 2 mols of a quaternary ammonium compound of the general formula $(R_3NH)^+Br^-$, and the desired 1,1-difluoro-substituted diene which are easily separated e. g., by distillation. In order to avoid interference with the formation of the quaternary ammonium compound, it is desirable to select a tertiary amine having a boiling point higher than triethylamine (B. P. 89.5–90° C.), although yields lower than those obtainable with higher tertiary amines are obtainable even with lower tertiary amines such as triethylamine or trimethylamine (which, however, are not preferred by us for the reasons just stated). Particularly good results are obtained by us through the use of such higher tertiary amines having 12 or more carbon atoms, as tributylamine and tri-i-amylamine. N,N-dimethylaniline was also found to give high yields in the dehydrobromination reactions. The following specific examples will illustrate the formation of 1,1-difluoro-substituted dienes by dehydrobromination reactions of this type.

*Example VII*

FORMATION OF 1,1-DIFLUORO-BUTADIENE-1,3

250 grams of triisoamylamine was heated to 180–190° in a flask equipped with stirrer, addition funnel and reflux condenser connected to cold traps. 1,3-dibromo-1,1-difluorobutane (126 g.) was slowly added to the hot amine. After 5 hours the reaction was discontinued. Fractionation of material in the cold traps gave 22 g. of $CF_2=CHCH=CH_2$, B. P. 3.5–5.0° for a 49% yield. This monomeric compound polymerized to a vulcanizable rubbery material having great resistance to swelling when exposed to solvents, petroleum oils and hydrocarbon fuels.

*Example VIII*

FORMATION OF 1,1-DIFLUORO-BUTADIENE-1,3 BY DEHYDROBROMINATION OF ADDUCT WITH DIMETHYLANILINE 400 grams of dimethylaniline were heated with 378 grams of $CF_2BrCH_2CHBrCH_3$, as described in Example VII. 109 g. of $CF_2=CHCH=CH_2$, B. P. 3.5–5.0, was obtained (80.8% yield).

*Example IX*

FORMATION OF 1,1-DIFLUORO-2-METHYL-BUTADIENE $CF_2BrCH(CH_3)CHBrCH_3 + 2(C_4H_9)_3N \longrightarrow$
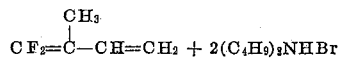
$CF_2=\overset{CH_3}{\underset{|}{C}}-CH=CH_2 + 2(C_4H_9)_3NHBr$ A small amount of the adduct from the reaction of $CF_2Br_2$ with butene-2 was added to a flask containing tributylamine (343 g.) and heated until reflux began. The dibromide was added until 133 g. had been used while product boiling around 50° was removed through a distillation column. This material was refractionated through a column packed with protruded packing and the following fractions collected:

| Fraction | Temp., ° C. | Wt., g. | $n_D{}^{25}$ | $d_4{}^{25}$ |
| --- | --- | --- | --- | --- |
| 1 | 34– | 4.5 | | |
| 2 | 39.0–39.5 | 10 | 1.3760 | 0.9582 |
| 3 | 39.5–42 | 9 | | |

The material in fraction 2 is $CF_2=\overset{CH_3}{\underset{|}{C}}-CH=CH_2$

The following physical constants were determined, B. P. 39.0° C., $n_D{}^{25}$ 1.3756, $d_4{}^{25}$ 0.9582. The molar refraction was observed to be 25.18 compared to the theoretical value of 24.35. A qualitative test for bromine was negative. The monomer upon exposure to air polymerized to a rubbery material; polymerization can be inhibited, e. g. by adding a small amount of t-butyl catechol.

*Example X*

FORMATION OF 1,1-DIFLUORO-3-METHYL-BUTADIENE FROM $CF_2BrCH_2CBr(CH_3)CH_3$

Two runs were made by heating tributylamine to 180–190° and adding the 1,3-dibromo-1,1-difluoro-3-methylbutane slowly. The following quantities were used:

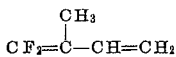

| | Run 1, g. | Run 2, g. |
| --- | --- | --- |
| Tributylamine | 610.5 | 419 |
| $CF_2BrCH_2CBr(CH_3)_2$ | 399 | 266 |

In this case the reactions were run in a flask equipped with stirrer, addition funnel and fractionating column fitted with a partial takeoff head. Distillate was removed at 30–50°. The crude material collected from the two runs was combined and refractionated to give 191 g. of

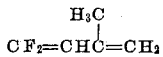
$CF_2=CH\overset{H_3C}{\underset{|}{C}}=CH_2$ with the following properties: B. P. 35.5° C., $n_D{}^{25}$ 1.3705, $d_4{}^{25}$ 0.9463, $MR_D$ 24.35 (calc'd), 24.875 (found). The monomeric material polymerized to a synthetic rubber having good resistance to swelling when exposed to the solvents, etc., mentioned in Example VII.

*Example XI*

FORMATION OF 1,1,3-TRIFLUOROBUTADIENE FROM $CF_2BrCH_2CFBrCH_3$

Example VII was repeated with 56 grams of tributylamine and 30 grams of $CF_2BrCH_2CFBrCH_3$ (from Example II), in lieu of the reactants of Example VII. About 5 grams of low boiling material was obtained. Upon fractionation, $CF_2:CHCF:CH_2$, boiling at 24.0–24.2° C. was obtained. This diene polymerizes spontaneously, but somewhat slower than the $CF_2:CHCH:CH_2$ of Example VII.

*Example XII*

FORMATION OF 1,1,3-TRIFLUORO-2-METHYL-BUTADIENE FROM $CF_2BrCH(CH_3)CFBrCH_3$

Example VII was again repeated, by reacting, in lieu of the reactants described therein, 71 grams of $CF_2BrCH(CH_3)CFBrCH_3$ (from Example IV) and 111 grams of tributyl-amine, at a temperature of about 180° C. The distillate was collected from 51–55° C. and refractionated. Fraction 2 was found to be free from bromine, by a sodium fusion test, and had the following physical data: B. P. 49–51° C., $n_D{}^{25}$ 1.3627, $d_4{}^{25}$ 1.0948, $MR_D$ 24.35 (calc'd), 24.78 (found). A sample of the diene was sealed in a glass tube; after several weeks the originally mobile liquid formed an increasingly viscous low molecular weight polymer.

From the foregoing description of our invention, it will be apparent to those skilled in the art that a variety of 1 to 1 adducts can be conveniently formed by reacting dibromodifluoromethane with suitable olefins, and that these adducts can be converted by dehydrobromination into 1,1-difluoro-substituted polymerizable dienes having valuable industrial properties. We do not with to be understood to limit the scope of our invention to the examples specifically herein set forth, inasmuch as modifications and adaptations within the spirit of our invention will readily occur to those skilled in the art. We thus intend to claim our invention broadly and to define its scope by the appended claims.

We claim:
1. 1,1,3-trifluoro-butadiene.
2. Polymeric 1,1,3-trifluoro-butadiene.
3. The process of reacting dibromodifluoromethane with 2-fluoropropylene, whereby a 1,3-dibrominated 1,1-difluorinated intermediate compound having an unsubstituted methyl terminal group is obtained, and dehydrobrominating the intermediate compound thus obtained to produce 1,1,3-trifluoro-butadiene.
4. The process according to claim 3, wherein the dehydrobrominating agent is a tertiary amine.
5. The process according to claim 3, wherein the dehydrobrominating agent is a tertiary amine having a boiling point of at least about 90° C.
6. The process according to claim 3, wherein the dehydrobrominating agent is a tertiary amine having at least 12 carbon atoms.
7. The process according to claim 3, wherein the dehydrobrominating agent is tributylamine.
8. A process of forming polymeric 1,1,3-trifluorobutadiene, comprising forming an adduct of dibromodi- fluoromethane and 2-fluoropropylene, whereby a 1,3-dibrominated 1,1,3-trifluorinated intermediate compound having an unsubstituted methyl terminal group is obtained, dehydrobrominating the intermediate product thus obtained, and polymerizing the resulting 1,1,3-trifluoro-butadiene.

9. The process of reacting dibromodifluoromethane with an olefinic compound having the general formula $H(C_2Y^1Y^2)CH_3$, wherein $Y^1$ and $Y^2$ are members of the group consisting of hydrogen, methyl, trihalomethyl and fluorine whereby an intermediate compound characterized by a terminal bromo-di-fluoro-methyl group and by an opposite terminal unsubstituted methyl group is obtained; and dehydrobrominating the intermediate compound thus obtained in the presence of a tertiary amine.

10. The process of reacting dibromodifluoromethane with an olefinic compound having the general formula $H(C_2Y^1Y^2)CH_3$, wherein $Y^1$ and $Y^2$ are members of the group consisting of hydrogen, methyl, trihalomethyl and fluorine whereby an intermediate compound characterized by a terminal bromo-di-fluoro-methyl group and by an opposite terminal unsubstituted methyl group is obtained; and dehydrobrominating the intermediate compound thus obtained in the presence of a tertiary amine having a boiling point of at least about 90° C.

11. The process of reacting dibromodifluoromethane with an olefinic compound having the general formula $H(C_2Y^1Y^2)CH_3$, wherein $Y^1$ and $Y^2$ are members of the group consisting of hydrogen, methyl, trihalomethyl and fluorine whereby an intermediate compound characterized by a terminal bromo-di-fluoro-methyl group and by an opposite terminal unsubstituted methyl group is obtained; and dehydrobrominating the intermediate compound thus obtained in the presence of a tertiary amine having at least 12 carbon atoms.

12. The process of reacting dibromodifluoromethane with an olefinic compound having the general formula $H(C_2Y^1Y^2)CH_3$, wherein $Y^1$ and $Y^2$ are members of the group consisting of hydrogen, methyl, trihalomethyl and fluorine whereby an intermediate compound characterized by a terminal bromo-di-fluoro-methyl group and by an opposite terminal unsubstituted methyl group is obtained; and dehydrobrominating the intermediate compound thus obtained in the presence of tributyl amine.

13. The process according to claim 9, wherein said tertiary amine is N,N-dimethylaniline.

14. The process of forming an adduct of dibromodifluoromethane with a compound having the general formula $H(C_2Y^1Y^2)CH_3$, wherein $Y^1$ and $Y^2$ are members of the group consisting of hydrogen, methyl, trihalomethyl, and fluorine, whereby an intermediate compound characterized by a terminal bromodifluoromethyl group and by an opposite terminal unsubstituted methyl group is obtained; dehydrobrominating the intermediate compound thus obtained in the presence of a tertiary amine, whereby a 1,1-difluorinated diene characterized by a terminal difluoromethylene group is produced; and polymerizing the resulting 1,1-difluorinated diene.

References Cited in the file of this patent

UNITED STATES PATENTS

| | | |
|---|---|---|
| 2,567,956 | Miller | Sept. 18, 1951 |
| 2,581,920 | Kuhn | Jan. 8, 1952 |
| 2,581,925 | Crane et al. | Jan. 8, 1952 |
| 2,647,110 | Wiseman | July 28, 1953 |
| 2,686,207 | Crane et al. | Aug. 10, 1954 |

FOREIGN PATENTS

| | | |
|---|---|---|
| 737,276 | Germany | July 9, 1943 |
| 856,145 | Germany | Nov. 20, 1952 |
| 70,108 | Denmark | June 18, 1952 |

OTHER REFERENCES

Wakefield: Rubber Age, vol. 68, No. 5, February 1951, page 570.

Miller: National Nuclear Energy Service, Div. III, 1, Preparation of Fluorocarbons by Polymerization of Olefins, pages 567–685 (1951).